United States Patent
Passoth et al.

(10) Patent No.: US 6,428,112 B1
(45) Date of Patent: Aug. 6, 2002

(54) COVERING OF VEHICLE TIRES WITHLIGHT-ALLOY RIMS DURING PROLONGED TRANSPORTATION

(75) Inventors: Half Passoth, Starzach; Hans Hagner, Dornstetten, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/719,246

(22) PCT Filed: May 29, 1999

(86) PCT No.: PCT/EP99/03738

§ 371 (c)(1),
(2), (4) Date: Feb. 14, 2001

(87) PCT Pub. No.: WO99/64255

PCT Pub. Date: Dec. 16, 1999

(30) Foreign Application Priority Data

Jun. 9, 1998 (DE) ..................................... 298 10 270 U

(51) Int. Cl.[7] .................................................. B60B 7/00
(52) U.S. Cl. ................................ 301/37.42; 301/37.102
(58) Field of Search ......................... 301/37.42, 37.103, 301/37.104, 37.31, 37.34, 37.35, 37.372, 108.1, 108.4, 37.102

(56) References Cited

U.S. PATENT DOCUMENTS

| | | | | |
|---|---|---|---|---|
| 1,494,179 A | * | 5/1924 | Matthew | 301/37.104 |
| 1,505,368 A | * | 8/1924 | Bohannon | 301/37.104 |
| 4,012,078 A | * | 3/1977 | Meyers | 301/37.42 |
| 4,382,635 A | * | 5/1983 | Brown et al. | 301/37.42 |
| 4,707,035 A | * | 11/1987 | Kondo et al. | 301/37.42 |
| 4,784,440 A | * | 11/1988 | Fair | 301/37.103 |
| 5,039,172 A | | 8/1991 | Krieger | |
| 5,249,845 A | * | 10/1993 | Dubost | 301/37.373 |
| 5,423,599 A | | 6/1995 | Sherod et al. | |
| 5,992,942 A | * | 11/1999 | Passoth et al. | 301/37.42 |
| 6,325,461 B1 | * | 12/2001 | Hauler | 301/37.42 |

FOREIGN PATENT DOCUMENTS

| | | |
|---|---|---|
| DE | 297 10 223 U1 | 9/1997 |
| DE | 196 34 508 C1 | 3/1998 |
| EP | 0 310 777 A1 | 4/1989 |
| GB | 2 229 975 A | 10/1990 |
| GB | 2 291 017 A | 1/1996 |

* cited by examiner

Primary Examiner—S. Joseph Morano
Assistant Examiner—Long Bao Nguyen
(74) Attorney, Agent, or Firm—Crowell & Moring, LLP

(57) ABSTRACT

A cover for light-metal wheels during protracted transport is provided by a round, closed, and inherently rigid film moulding which engages over the outer face of the light-metal rim beyond the rim flange in a surface-covering manner. The cover is positively fastened centrally in wheel-side recesses by elevations integrally formed in the film moulding. A centering bore, known per se, is utilized for a more secure central fastening of the film moulding to the vehicle wheel. The film moulding carries, in its center, a cylindrical extension which is pressed into the centering bore of the vehicle wheel. The inner surface of the centering bore may have a circumferential groove of preferably trapezoidal cross section. The cylindrical extension of the film moulding carries circumferentially a plurality of catch noses which correspond in axial position and cross-sectional shape to the wheel-side circumferential groove and engage positively into the latter. To make pressing-in easier, a plurality of axially running grooves are made on the circumference of the cylindrical extension. The film moulding is designed with a wavy cross section in the part covering the rim outer face, the center line of the waves themselves likewise being arcuately curved axially outwards.

13 Claims, 3 Drawing Sheets

COVERING OF VEHICLE TIRES WITH LIGHT-ALLOY RIMS DURING PROLONGED TRANSPORTATION

BACKGROUND OF THE INVENTION

The present invention relates to a cover for vehicle wheels with light-metal rims during protracted transport such as is known, for example, from German publication DE 297 10 223 U1.

Light-metal rims, because of their greater permeability, as compared with steel rims covered by hubcaps, require a separate transport cover for protecting the brake disc against exterior rusting during protracted transport. Light-metal rims, moreover, usually contain a central centering bore which is designed identically at least in the case of all the rim types of a vehicle manufacturer which are provided for initial equipment. The outer orifice of this centering bore is closed when the vehicle is in the customer's possession by a snapped-in lid which bears the vehicle manufacturer's company logo. During transport, these snapped-in lids are removed and are placed as accessories in the vehicle interior.

In a wheel cover of the type referred to and known from DE 196 34 508 C1, the vehicle wheel is covered with a closed film moulding and fastened centrally to the vehicle wheel by fastening bosses which engage non-positively on the wheel screws/nuts or the corresponding countersinks. Although it is thereby possible for the cover to be mounted or demounted simply and quickly by hand, a secure hold of the cover on the vehicle wheel is not obtained in every instance of the many thousands which arise. In individual instances, therefore, the covers may come loose from the wheel during travel and/or in the event of a strong cross wind. It must also be remembered, in this connection, that, in individual instances, the wheel cover has to be removed in order to check and/or increase the tire air pressure. A cover according to the prior art, once it has fallen off or been deliberately removed, will therefore not be readily capable of being fastened securely to the vehicle wheel, because, when the film moulding is put in place for the first time, the bosses of the latter are often permanently deformed and, after the cover has been attached to a vehicle wheel for a second time, no longer make the secure non-positive connection to the screw-head countersinks which would be necessary per se. The secure fastening of a film moulding according to the prior art which is attached for the second time requires an additional aid, such as, for example, adhesive strips or the like. This is complicated and time-consuming.

In the wheel cover according to German Publication DE 297 10 223 U1 mentioned in the introduction, the film moulding has, in its center, a cylindrical holding connection piece which corresponds in diameter to the centering bore and which is inserted into the centering bore under prestress. A circumferentially extending row of catch noses on the circumference of the holding connection piece forms a positive connection with the rim hub. The shield part of the known wheel cover, lying radially between the wheel-screw ring and the rim flange, is virtually planar and is stiffened by a plurality of radially running reinforcing welts. So that the wheel cover fastened to the vehicle wheel can be released from the wheel again, as required, a grip depression is integrally formed in the film moulding on each of the two sides of one of the reinforcing welts. The known wheel cover can therefore be released from the wheel only by pulling at an eccentrically located point and along with considerable deformations of the transitional region from the shield part into the holding connection piece. The risk of tears and permanent deformations in the film moulding is, in this case, so great that it sometimes cannot be reused again. Should such a temporary removal of the known wheel cover, for example because of a loss of air pressure in the tire, be necessary during transport, and should the wheel cover be damaged at the same time, the brake disc of the respective wheel is unprotected for the remainder of the transport. A reliable reusability of the wheel cover is therefore necessary in functional terms.

US Pat. No. 5,039,172, likewise, shows a protective transport cover for light-metal rims of vehicles which is formed from a plastic film. In the near-center region of the wheel cover and at the outer edge, the film extends, in each case, in plane form and is provided there, on the wheel-facing side, with an annularly running pressure-sensitive adhesive strip with adhesive on two sides. In the cover part located radially between the center and the outer edge, the wheel cover has a highly wavy cross section as a result of a plurality of annular welts lying concentrically within one another. When the wheel cover is in the relaxed state, the wavy profile extends symmetrically on the near side and on the far side of the uniform plane of the center part and of the edge part. The purpose of this wavy cross-sectional configuration of the wheel cover is to make it possible, without great effort, to displace elastically the planar center part axially relative to the likewise plane edge part of the wheel cover and to adapt the center part to the rim. A precondition for using the wheel cover dealt with here is that, not only does the centering bore have a planar edge, but the rim flange also has an annularly running, likewise planar surface, in each case of a particular minimum width. However, planar surfaces of this type with a particular minimum width are ugly in configurational terms and are therefore not accepted by the customer. Consequently, as a rule, only surfaces curved to a greater or lesser extent are present on the rim, which, by virtue of their curvatures, can offer only relatively narrow adhesive surfaces for the film moulding, inherently rigid in the region of adhesion, and can therefore retain the wheel cover only with low forces. Apart from this, pressure-sensitive adhesives tend to creep when they undergo a long-lasting force action, as in the present case on account of the axially elastic deformation of the initially essentially planar wheel cover. It may therefore be that the point of adhesion of the wheel cover in the near-center region automatically comes loose from the rim over time. Another disadvantage of pressure-sensitive adhesives is that they generally become brittle and lose their adhesive force under the action of sunlight. When softeners counteracting embrittlement are added to the pressure-sensitive adhesives, there is the risk that adhesive residues will be left behind on the wheel rim after the removal of the wheel cover. These would have to be eliminated manually in a complicated way by the use of solvents. German publication DE 196 34 508 C1, assessed further above, refers to this problem in connection with a rim cover which it describes as being connected by a self-adhesive film. Apart from the cost disadvantage of pressure-sensitive adhesive strips and their attachment, the known protective transport cover to be glued to the rim therefore has many disadvantages in terms of use and, because of this, it is not considered advantageous by a person skilled in the art.

The cap for light-metal rims, which is shown in European publication EP 310 777 A1, is also designated as a wheel cover there, but it does not constitute a transport cover within the meaning of the present invention. On the contrary, the known cap is a decorative cap which is attached to the vehicle wheel during the normal use of the vehicle. The cap is intended to cover the near-center region of the light-metal rims, into the region of the wheel fastening screws, with a smooth surface and in an aesthetically pleasing way. Since the known decorative cap extends radially only as far as the wheel fastening screws, it cannot in any way assume the function of transport protection which is in question here. Moreover, the known decorative cap is designed as an injection moulding and not as a film moulding capable of being produced cost-effectively by a thermal deep-drawing method. In order to fasten the decorative cap to the light-metal rim, the decorative cap has, on the wheel-facing side, a plurality of axially projecting, radially resilient tongues which reach axially into the centering bore of the rim and bear under prestress on the inner surface of the bore. Integrally formed on the outside of the free ends of the elastic tongues are beads of triangular cross section which engage into a circumferential groove of trapezoidal cross section in the inner surface of the centering bore and thus positively secure the decorative cap axially on the light-metal rim. For simple demounting of the decorative cap, for example when a wheel change becomes necessary, deflecting bosses corresponding to one another are integrally formed on the outer edge of the decorative cap, on the one hand, and on the edge of the countersink receiving the decorative cap and located in the light-metal rim, on the other hand. By twisting the decorative cap, the deflecting bosses can be brought into engagement with one another, thus building up an axial force which is directed away from the wheel and by which the decorative cap can be released axially from the positive connection.

British publication GB 2 291 017 A, likewise, shows a decorative wheel cap. However, in the situation dealt with here, this cap can be used expediently only with steel rims on account of specific conditions. Conventionally, decorative wheel caps of steel rims cover the latter into the region of the rim flange and are clamped elastically to the outer circumference by way of the rim. However, the decorative wheel cap shown in the British publication mentioned here is of non-round design in the outer region for configurational reasons and also does not extend at all radially into the region of the rim flange. Since conventional outer clamping of the decorative wheel cap is ruled out as a result, the British publication mentioned here shows special measures for a near-center fixing of the decorative wheel cap. Specifically, four steel tongues project axially from the edge of the centering bore of the steel rim towards the outside of the wheel. The steel tongues together form a quadruply longitudinally slotted cylinder. Each of the tongues is reinforced at its free end in wall thickness both radially outwards and radially inwards. The tongues thus have holding extensions. Integrally formed in the center of the plastic decorative wheel cap produced as an injection moulding is an essentially cylindrical orifice. The inner surface of the orifice contains four shallow circumferential recesses which correspond to the four wheel-side steel tongues as "negatives" to the shape of the latter. The known decorative wheel cap can therefore be slipped axially onto the wheel-side steel tongues. It is thereby centered on the vehicle wheel and secured fixedly in terms of rotation. Although the radially outer holding extensions at the ends of the steel tongues partially engage behind the edge of the cap-side orifice, they cannot offer sufficient safety against slipping off axially due to vibrations caused during driving. In order to improve the axial fixing of the known decorative wheel cap and to cover the remaining orifice, a decorative lid is provided. In a way similar to a bayonet fastening on the filler neck of a fuel tank, this lid can be fixed by an axial introduction movement and a subsequent rotational movement on the four steel tongues and their inner holding extensions. In order to handle the decorative lid, the latter is provided, likewise in the same way as a tank filler cap, on the free outer face with two grip depressions separated by a diametrically running bead.

British publication GB 2 229 975 A shows a wheel of the single type for use on doll prams, perambulators, shopping trolleys, office chairs or the like. The wheel, including the wheel tire, consists of a plurality of round plastic parts which can be plugged together axially and at the same time snapped permanently together with one another by elastic holding noses and catch depressions. The closing disc of the single wheel, located on the outside of the wheel, is an integral and supporting component of the wheel. There is no provision for demountability of the individual parts of the wheel on account of the inexpensive design of the single wheels.

SUMMARY OF THE INVENTION

The object of the present invention is to improve the rim cover so that it adheres to the vehicle wheel with a greater degree of fail safety and so that, even after temporary demounting, the rim cover can be attached to the wheel once again, just as securely, and adheres securely in place, as originally. As a result, the wheel cover can readily be reused after being in service.

According to the present invention a circumferential groove present in the inner surface of a wheel-side centering bore is utilized for the central fastening of the film moulding. By virtue of the axially running grooves integrally formed on the circumference of the holding connection piece, the holding connection piece can yield elastically in the radial direction when being inserted axially into the centering bore, or else when being pulled out. As a result, the application of the wheel cover, or its removal, becomes appreciably easier and even only slight damage to the catch noses or the holding connection piece is avoided. The deliberately small dimensioning of the end-face reinforcing flange also contributes to promoting a radial resilience of the holding connection piece. At the same time, however, a higher radial rigidity is achieved on the end face than at the region to be located axially towards the base of the holding connection piece. The high resilience in the shield part of the wheel cover, which is desirable for reasons of easy demountability and for the purpose of adaptability to different rim designs, is paired with an elastic prestress which ensures a secure hold on the rim. This is achieved by the cross-sectional shape of the shield part, which is inherently wavy, on the one hand, and is curved as a whole, on the other hand, together with the conical transition into the holding connection piece.

BRIEF DESCRIPTION OF THE DRAWINGS

The invention is explained below by way of an exemplary embodiment illustrated in the drawings in which.

DESCRIPTION OF THE PREFERRED EMBODIMENT

Figure 1:
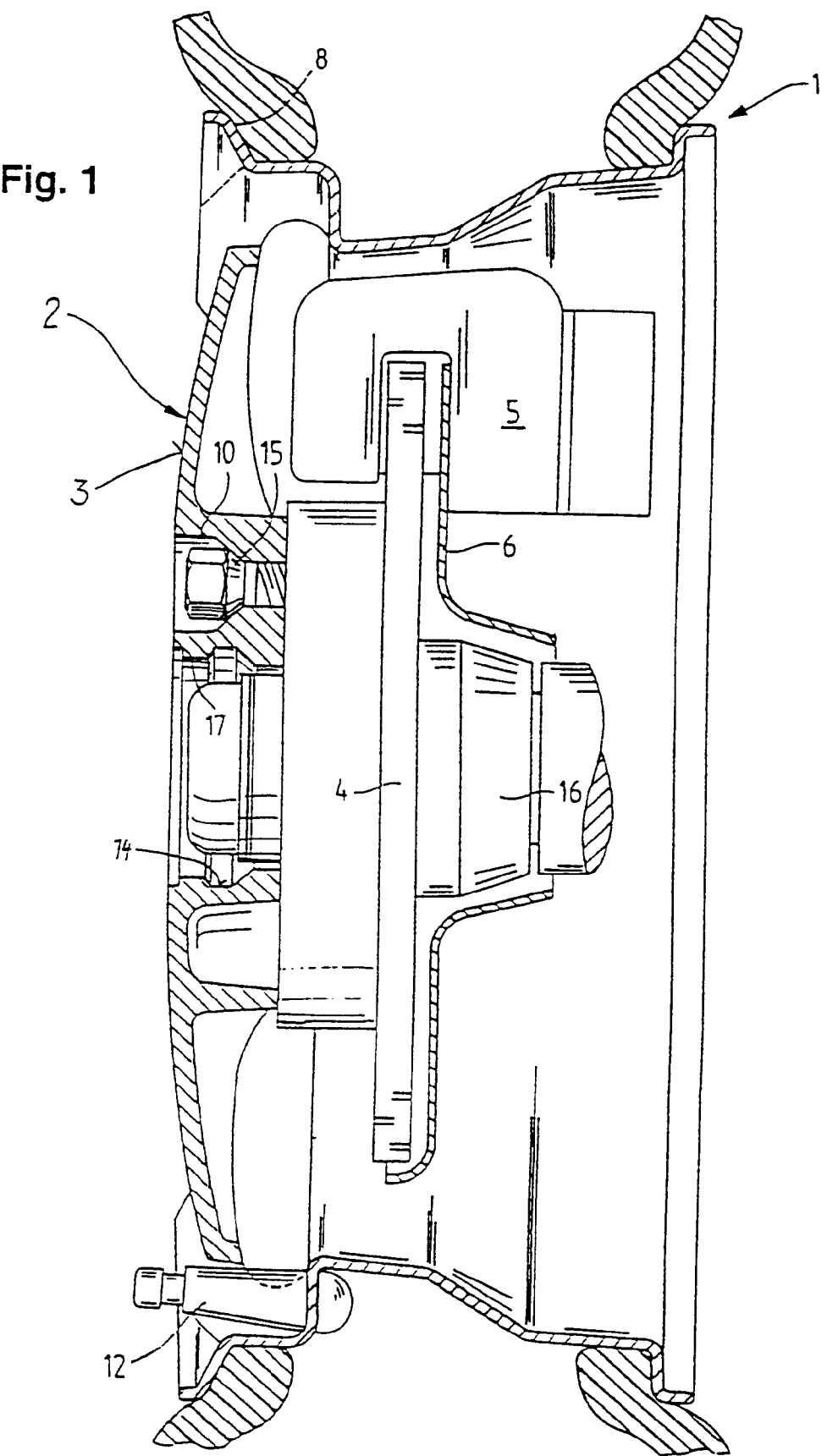
Figure 1 shows a cross section through a vehicle wheel with a light-metal rim and with a disc brake, but without an outer wheel cover.
Figure 2:
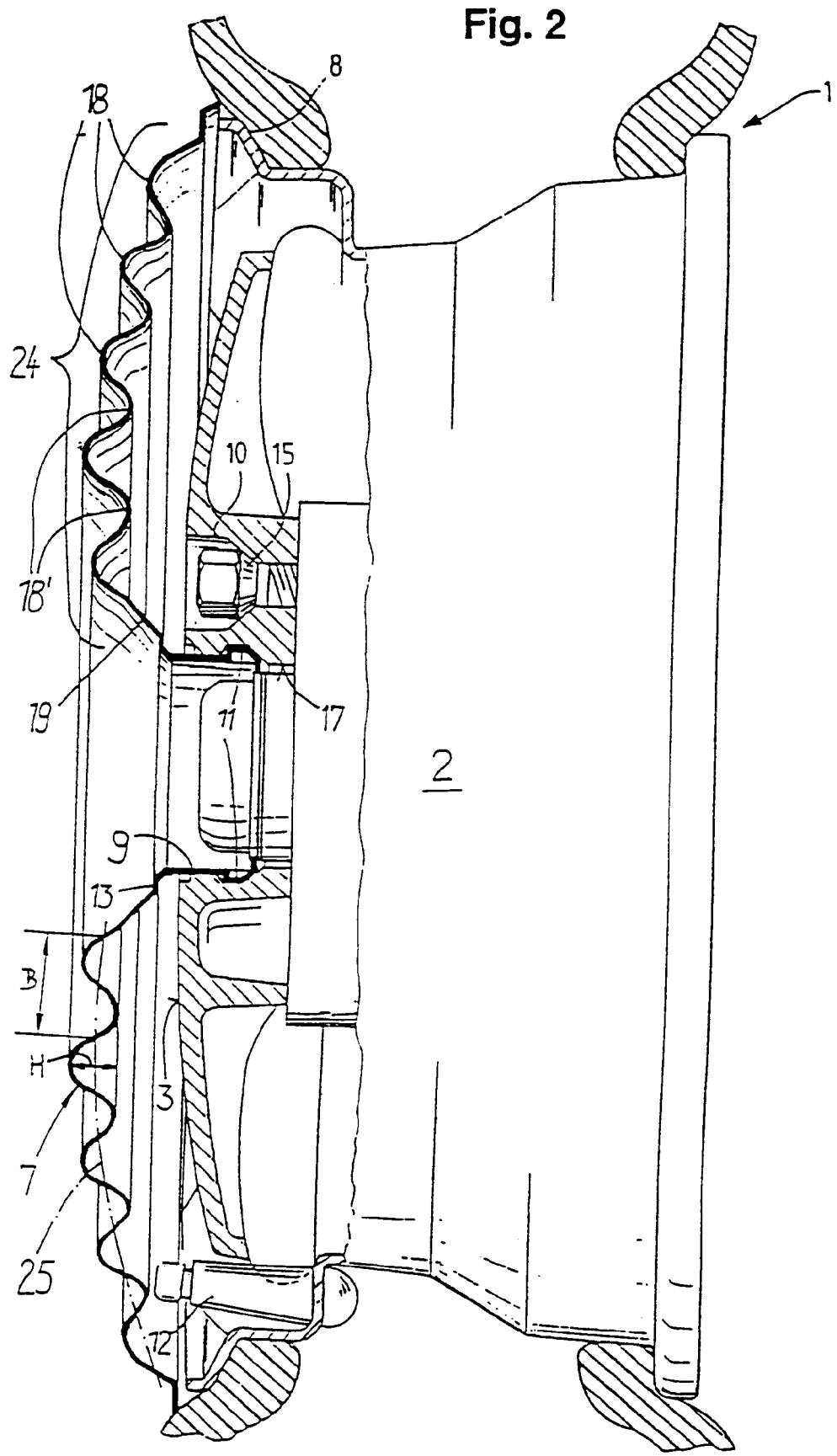
FIG. 2 shows a partial cross section through the vehicle wheel according to FIG. 1 with a wheel cover provided by an inherently rigid film moulding.
Figure 3:
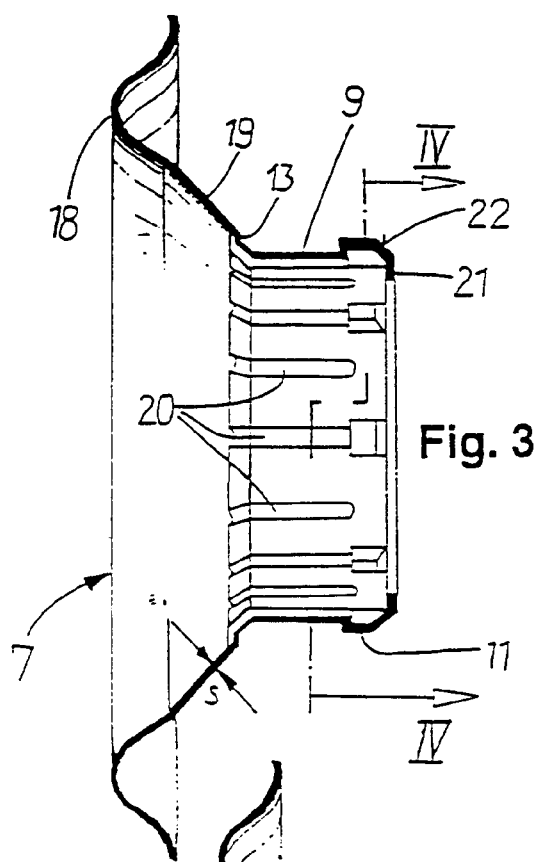
FIG. 3 shows an enlarged individual illustration of the central cylindrical holding connection piece of the film moulding according to FIG. 2.
Figure 4:
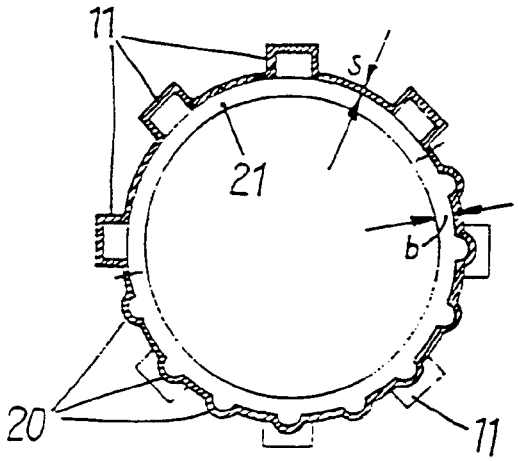
FIG. 4 shows an axially perpendicular cross section through the holding connection piece according to FIG. 3 along section line IV-IV.

The vehicle wheel 1, partially illustrated in cross section in FIG. 1, has a light-metal rim 2 equipped on the outside with a tire, shown partially, the tire beads of which bear on the rim flanges 8. Attached at a circumferential point on the rim is a filling valve 12 which projects slightly beyond the outer face 3 of the wheel. The rim 2 is screwed by wheel screws 15 to a flange, which cannot be seen here, of the rotatably mounted wheel hub 16. The heads of the wheel screws are sunk on the outside in a cylindrical countersink 10 of the wheel body. The cap-shaped brake disc 4 rotating together with the wheel 1 is also fastened, by other screws, to the wheel-hub flange, so that the wheel-hub flange comes to lie within the cap-shaped hub region of the brake disc and is covered by the latter. At a circumferential point on the brake disc 4, usually at the top, the fixedly held brake caliper 5, together with the brake pads and the pressure piston for the pads, is arranged in such a way that the brake caliper executes all the suspension-induced wheel movements and is held in a constant position in relation to the wheel. On the brake disc inner face facing away from the wheel, that is to say pointing towards the vehicle center, a splash guard disc 6 is likewise held in a constant position in relation to the brake disc 4, engages over the latter with a slight clearance outside the brake caliper and protects the brake disc against gushes of water and splashes of dirt or of slush from the opposite vehicle wheel. This splash guard disc 6 also, of course, protects the inner face of the brake disc on transport overseas against the unimpeded ingress of salt-containing air and therefore against corrosion on this side.

So as also to protect effectively the outward-facing side of the brake disc against attack by salt-containing air during protracted transport, the outward-facing side 3 of the vehicle wheel 1 is covered, during transport, with a closed inherently rigid film moulding 7 fastened to the wheel. This cover, while being produced identically for different rim designs, is to be capable of being mounted easily and also of being mounted anew and so as to be releasable again, but is nevertheless to afford a secure hold on the vehicle wheel in every case.

According to the invention, the centering bore 17 of the vehicle wheel 1, in the center of the wheel, is utilized for this purpose. The centering bore extends as far as the wheel outer face 3 and is provided on its inner surface with a circumferential groove 14. The film moulding 7 has correspondingly, in its center, a cylindrical holding connection piece 9 which extends axially towards the vehicle wheel. The holding connection piece corresponds in diameter to the centering bore 17, into which it projects under prestress. The holding connection piece 9 shown in the exemplary embodiment has, on its circumference, a circumferentially extending row of catch noses 11 which correspond in axial position and cross-sectional shape to the wheel-side circumferential groove 14 or are held at least within the clearance profile of the circumferential groove. By way of these catch noses, the holding connection piece 9, and with it the entire film moulding 7, is secured positively in the circumferential groove of the centering bore. The radial height of the catch noses is about 8 to 12 times the film wall thickness, this not being illustrated to scale because the film thickness is depicted as exaggerated.

In order to introduce the holding connection piece into the centering bore, the holding connection piece must yield radially inwards by the amount of the radial dimension of the catch noses. In the inserted state, however, it bears under slight prestress on the inner surface of the centering bore, so that the film moulding can thus be centered, free of play, on the rim. So that the holding connection piece can be introduced axially into the centering bore, without bulging inwards in an uncontrolled way, a plurality of uniformly distributed and axially running grooves 20 are integrally formed on the circumference of the holding connection piece. By virtue of these grooves, the holding connection piece can yield elastically in the radial direction when inserted axially into the centering bore or else when pulled out of the latter, thus making it appreciably easier to apply the wheel cover or remove it and avoiding even only slight damage to the catch noses or the holding connection piece. By virtue of the grooves 20, which may be curved radially outwards or radially inwards and of which twice as many are provided as the catch noses, the holding connection piece can yield inwards locally in the region of each catch nose, at least on the side facing axially away from the reinforcing flange 21. The catch noses can thereby be pushed more easily into the centering bore.

Figure 5:
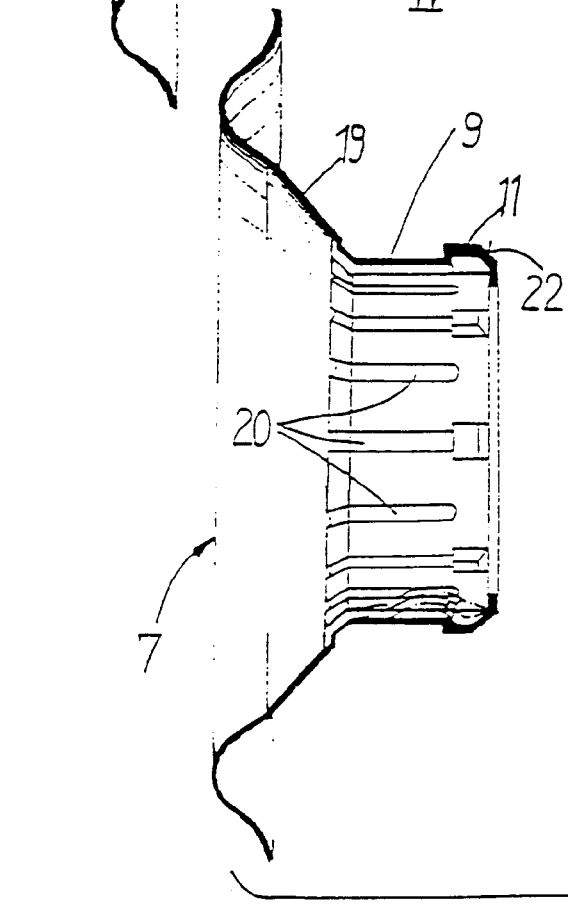
FIG. 5 shows the cylindrical holding connection piece according to FIG. 3 and the wheel-side centering bore in a coaxial relative position prior to the central attachment of the wheel cover to the vehicle wheel.
Figure 5:
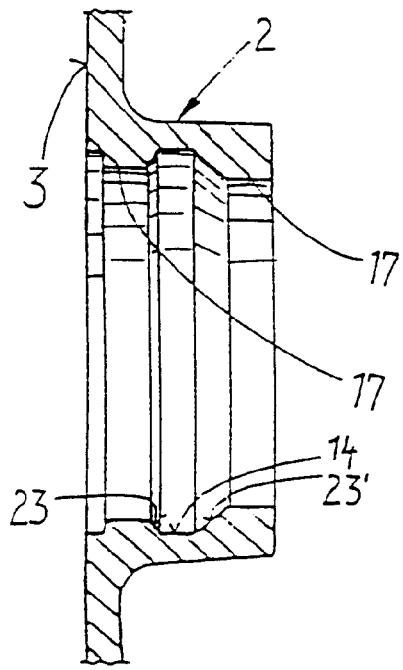

In order to promote radial resilience of the holding connection piece, it does not have a closed bottom on its free end face. Such a bottom would even cause an obstruction because of a wheel-hub bearing projecting into the centering bore. Instead, merely a narrow, radially inward-projecting reinforcing flange 21 is provided on the free end face of the cylindrical holding connection piece 9, the reinforcing flange affording radially some resistance and a stiffening effect. Its radial width b corresponds approximately to 8 to 12 times the wall thickness s of the film moulding 7, although this cannot be illustrated to scale because the wall thickness is depicted as exaggerated. Admittedly, the reinforcing flange, the axial position of which corresponds approximately to that of the inner end of the catch noses, radially stiffens the holding connection piece in its axial position, as is plainly intended. However, the holding connection piece is radially softer in the region located axially further towards the outside of the wheel. In order to graduate the transition from the radially relatively stable end-region of the holding connection piece to the regions to be located axially towards the base of the holding connection piece, the axially running grooves 20 are restricted to that axial region of the holding connection piece which lies axially between the catch noses 11 and the base of the holding connection piece. As a result of these different radial hardnesses of the holding tenon, the catch noses can shift away pivotally radially inwards into or out of the centering bore when the holding tenon is respectively inserted or pulled out, an apparent pivoting center being located in the vicinity of the reinforcing flange. This pivoting position of a catch nose is indicated by dash-and-dot lines in FIG. 5.

In order to make it easier to introduce the holding connection piece 9 axially into the centering bore 17, the catch noses 11 are provided with a slope 22 at least on the side which leads in the direction of insertion. When the holding connection piece is being inserted into the centering bore, an axial pressure is exerted on the catch noses by the edge of the centering bore via the slopes 22 and is conducive to the abovementioned pivoting inward yielding of the catch noses. The wheel-side circumferential groove 14 of the centering bore is designed with a trapezoidal cross section having inclined lateral flanks 23, 23'. The inclined outer lateral flange 23 of the circumferential groove makes it easier to pull off the holding connection piece from the centering bore without any damage. During the pulling-off action, the catch noses can slide radially inwards on the flank inclination and at the same time pivot away radially inwards in the way described above.

The film moulding 7 is designed to be highly resilient in the shield part 24 covering the rim outer face 3, so that the shield part can be lifted off from the outside of the wheel, as required. Such a requirement may occur, for example, when the tire air pressure is being checked and, if appropriate, increased or during the ultimate removal of the wheel cover. By virtue of the elastic resilience of the shield part 24, the latter can be lifted locally and the holding connection piece be reached underneath the shield part manually or else by way of a fork-like pull-off tool. The holding connection piece can then be pulled axially out of the centering bore carefully and without any damage.

The highly resilient design of the film moulding 7 also affords the advantage that the same film moulding 7 can be used for different rims, each with different press-in depths, that is to say an interlock at a different depth in the axial direction of the hub. This is possible since the relative position between the edge of the shield part 24 and the catch noses 11 of the holding connection piece 9 can be changed within wide limits. In spite of these possibilities of very wide variation, an elastic bracing of the shield part 24 is always ensured, thus resulting in a secure retention of the film moulding 7 on the rim.

In order to give the shield part 24 of the film moulding high elastic resilience, the latter has a wavy design in cross section and has a plurality of circumferential beads 18 and circumferential grooves 18' adjoining one another in a wavy manner. The wall of the shield part forms, in radial cross section, a sinusoidal 20 wave train composed of adjacent circumferential beads 18 and circumferential grooves 18'. The center line 25 of this wave train is itself likewise arcuately curved axially outwards. The radially innermost circumferential bead of the shield part 24 emerges via a cone frustum 19 into the cylindrical holding connection piece 9. At the same time, a narrow axially perpendicular collar 13 is arranged between the cone frustum and the holding connection piece. A wave train having an at least approximately uniform cross section is formed in the shield part 24 by the circumferential beads and circumferential grooves. The common radial width B of adjacent circumferential beads and circumferential grooves in this wave train is about 5 to 10% of the diameter of the film moulding 7, and the common height H corresponds approximately to 25 to 40%, preferably about 30%, of the, common radial width B.

It is recommended to produce the film moulding 7 from a hard film of thermoplastic, for example even from a recycled plastic. Initial specimens of the film moulding were produced from polyethyleneterephthalate (PET) . Polypropylene (PP) or polystyrene (PS) may be used successfully. The wall thickness s of the film moulding is about 0.5 mm, with the result that it has some inherent stability. This wall thickness is illustrated, exaggerated, in the drawings.

In order to produce the film moulding, the known widespread film deep-drawing technique is. In this technique, a blank of flat film material is tentered or pinned on along the edge in a frame or endlessly rotating pin chains for handling purposes, is heated to forming temperature by radiant heating and is laid onto an air-permeable shaping die. The gusset spaces remaining between the die surface and the softened film are evacuated, so that the film mates accurately to contour with the shaping die surface. In this state, with the vacuum being maintained, the shaped workpiece blank is cooled and can then be removed from the die and released from the edge tentering. The outer edge subsequently also has to be trimmed and the bottom of the holding connection piece punched out along the inner edge of the reinforcing flange 21, and the film moulding is ready. For shaping the undercuts in the region of the catch noses 11, it is necessary to have a die with slides which make it possible for the film moulding blank to be removed from the shaping die without difficulty. Defined blanks may be used as film material. Alternatively, film material may also be used which is unwound directly from a reel, without previously being cut to blank size.

The film moulding protects not only the brake disc against corrosion, but, of course, also the light-metal rim itself against dirt caused during transport. It must be considered, at the same time, that, under some circumstances, the vehicle is transported, standing freely on the transport vehicle, over long distances by rail and/or by road vehicle and road dust, spray and the like settle on the vehicle during this journey. However, by virtue of the wheel cover, even after protracted transport under unfavourable atmospheric conditions, the light-metal rim is clean when the cover is removed.

What is claimed is:

1. Cover for vehicle wheels with light-metal rims during protracted transport, comprising:

a round, closed and inherently rigid film moulding with which an outward-facing side of one of the vehicle wheels is covered, said moulding engaging over the outer face of a light-metal rim beyond a rim flange in a surface-covering manner and being fastened centrally to the vehicle wheel in recesses of the latter by elevations integrally formed in the film moulding and corresponding to the recesses as negatives of the shape of the latter, a cylindrical holding connection piece in the center of the film moulding which extends axially towards the vehicle wheel and corresponds in diameter to a centering bore of the rim and which projects into the centering bore of the vehicle wheel under prestress, and a circumferentially extending row of catch noses on a circumference of the holding connection piece, which catch noses form a positive connection with the rim hub, wherein the catch noses on the circumference of the cylindrical holding connection piece in the center of the film moulding correspond in axial position and cross-sectional shape to a circumferential groove, made in the inner surface of the centering bore, wherein the cylindrical holding connection piece in the center of the film moulding carries, on its circumference, a plurality of axially running grooves which are restricted to an axial region of the holding connection piece which lies axially between the catch noses and a base of the holding connection piece, wherein the cylindrical holding connection piece in the center of the film moulding carries, on its free end face, only a radially inward-projecting reinforcing flange, the radial width of which corresponds approximately to 8 to 12 times the wall thickness of the film moulding, wherein the film moulding is designed with a wavy cross section in a shield part covering the outer face of the light-metal rim and has a plurality of circumferential beads and circumferential grooves adjoining one another in a wavy manner, the center line of the circumferential beads and circumferential grooves adjoining one another in a wavy manner likewise being arcuately curved axially outwards in the shield part, covering the rim outer face, of the film moulding itself, and wherein the radially innermost circumferential bead of the shield part merges via a cone frustum into the cylindrical holding connection piece, a narrow axially perpendicular collar being arranged between the cone frustum and said holding connection piece.

2. Cover according to claim 1, wherein the catch noses are sloped at least on a side which leads in the direction of insertion.

3. Cover according to claim 1, wherein the circumferential beads and circumferential grooves in the shield part of the film moulding are designed approximately uniformly and together form a wave train of at least approximately uniform cross section.

4. Cover according to claim 3, wherein the wave train formed in cross section jointly by the circumferential beads and circumferential grooves has a common radial width of adjacent circumferential beads and circumferential grooves of about 5 to 10% of the diameter of the film moulding.

5. Cover according to claim 3, wherein the wave train formed in cross section jointly by the circumferential beads and circumferential grooves has a common height of adjacent circumferential beads and circumferential grooves of 25 to 40% of the common radial width of adjacent circumferential beads and circumferential grooves.

6. Cover according to claim 5, wherein said common height is about 30% of said common radial width.

7. Cover for vehicle wheels with light-metal rims during protracted transport, comprising:
   a round, closed and inherently rigid film moulding with which an outward-facing side of one of the vehicle wheels is covered, said moulding engaging over the outer face of a light-metal rim beyond a rim flange in a surface-covering manner and being fastened centrally to the vehicle wheel in recesses of the latter by elevations integrally formed in the film moulding and corresponding to the recesses as negatives of the shape of the latter,
   a cylindrical holding connection piece in the center of the film moulding which extends axially towards the vehicle wheel and corresponds in diameter to a centering bore of the rim and which projects into the centering bore of the vehicle wheel under prestress, and
   a circumferentially extending row of catch noses on a circumference of the holding connection piece, which catch noses form a positive connection with the rim hub,
   wherein the catch noses on the circumference of the cylindrical holding connection piece in the center of the film moulding are held at least within a clearance profile of the circumferential groove made in the inner surface of the centering bore,
   wherein the cylindrical holding connection piece in the center of the film moulding carries, on its circumference, a plurality of axially running grooves which are restricted to an axial region of the holding connection piece which lies axially between the catch noses and a base of the holding connection piece,
   wherein the cylindrical holding connection piece in the center of the film moulding carries, on its free end face, only a radially inward-projecting reinforcing flange, the radial width of which corresponds approximately to 8 to 12 times the wall thickness of the film moulding,
   wherein the film moulding is designed with a wavy cross section in a shield part covering the outer face of the light-metal rim and has a plurality of circumferential beads and circumferential grooves adjoining one another in a wavy manner, the center line of the circumferential beads and circumferential grooves adjoining one another in a wavy manner likewise being arcuately curved axially outwards in the shield part, covering the rim outer face, of the film moulding itself, and
   wherein the radially innermost circumferential bead of the shield part merges via a cone frustum into the cylindrical holding connection piece, a narrow axially perpendicular collar being arranged between the cone frustum and said holding connection piece.

8. Cover according to claim 7, wherein the catch noses are sloped at least on a side which leads in the direction of insertion.

9. Cover according to claim 7, wherein the circumferential beads and circumferential grooves in the shield part of the film moulding are designed approximately uniformly and together form a wave train of at least approximately uniform cross section.

10. Cover according to claim 9, wherein the wave train formed in cross section jointly by the circumferential beads and circumferential grooves has a common radial width of adjacent circumferential beads and circumferential grooves of about 5 to 10% of the diameter of the film moulding.

11. Cover according to claim 9, wherein the wave train formed in cross section jointly by the circumferential beads and circumferential grooves has a common height of adjacent circumferential beads and circumferential grooves of 25 to 40% of the common radial width of adjacent circumferential beads and circumferential grooves.

12. Cover according to claim 11, wherein said common height is about 30% of said common radial width.

13. Cover for vehicle wheels with light-metal rims during protracted transport, comprising:
   a round, closed and inherently rigid film moulding with which an outward-facing side of one of the vehicle wheels is covered, said moulding engaging over the outer face of a light-metal rim beyond a rim flange in a surface-covering manner and being fastened centrally to the vehicle wheel in recesses of the latter by elevations integrally formed in the film moulding and corresponding to the recesses as negatives of the shape of the latter,
   a cylindrical holding connection piece in the center of the film moulding which extends axially towards the vehicle wheel and corresponds in diameter to a centering bore of the rim and which projects into the centering bore of the vehicle wheel under prestress, and
   a circumferentially extending row of catch noses on a circumference of the holding connection piece, which catch noses form a positive connection with the rim hub,
   wherein the catch noses on the circumference of the cylindrical holding connection piece in the center of the film moulding are held at least within a clearance profile of the circumferential groove and lock into the latter,
   wherein the cylindrical holding connection piece in the center of the film moulding carries, on its circumference, a plurality of axially running grooves which are restricted to an axial region of the holding connection piece which lies axially between the catch noses and a base of the holding connection piece, wherein the cylindrical holding connection piece in the center of the film moulding carries, on its free end face, only a radially inward-projecting reinforcing flange, the radial width of which corresponds approximately to 8 to 12 times the wall thickness of the film moulding, wherein the film moulding is designed with a wavy cross section in a shield part covering the outer face of the light-metal rim and has a plurality of circumferential beads and circumferential grooves adjoining one another in a wavy manner, the center line of the circumferential beads and circumferential grooves adjoining one another in a wavy manner likewise being arcuately curved axially outwards in the shield part, covering the rim outer face, of the film moulding itself, and wherein the radially innermost circumferential bead of the shield part merges via a cone frustum into the cylindrical holding connection piece, a narrow axially perpendicular collar being arranged between the cone frustum and said holding connection piece.

* * * * *